(12) United States Patent
Kim et al.

(10) Patent No.: US 9,333,648 B2
(45) Date of Patent: May 10, 2016

(54) CONTROL OF ROBOT HAND TO CONTACT AN OBJECT

(75) Inventors: Ji Young Kim, Anyang-si (KR); Yong Jae Kim, Seoul (KR); Kyung Shik Roh, Seongnam-si (KR); Young Bo Shim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1031 days.

(21) Appl. No.: 13/275,856

(22) Filed: Oct. 18, 2011

(65) Prior Publication Data

US 2012/0123589 A1     May 17, 2012

(30) Foreign Application Priority Data

Nov. 17, 2010 (KR) .......................... 10-2010-0114461

(51) Int. Cl.
*B25J 13/08* (2006.01)
*B25J 9/16* (2006.01)

(52) U.S. Cl.
CPC .............. *B25J 9/1612* (2013.01); *B25J 13/084* (2013.01); *G05B 2219/39484* (2013.01); *G05B 2219/39532* (2013.01)

(58) Field of Classification Search
CPC .......... B25J 5/00; B25J 9/1612; B25J 13/081; B25J 13/084; B25J 13/086; B25J 15/0009; B25J 13/085; G05B 2219/39523; G05B 2219/39532; G05B 2219/39484; G05B 2219/40564; G05B 2219/40607
USPC ................. 700/245, 250, 252–254, 257–262; 901/33, 34, 44, 46–47
See application file for complete search history.

(56) References Cited

U.S. PATENT DOCUMENTS 8,041,457 B2 * 10/2011 Ohno ............................ 700/259
8,260,457 B2 * 9/2012 Yokoyama .................... 700/245

(Continued)

FOREIGN PATENT DOCUMENTS

EP        1992455 A1    11/2008
JP        2010-131702    6/2010

(Continued)

OTHER PUBLICATIONS

Korean Office Action issued Aug. 13, 2012 in corresponding Korean Patent Application No. 10-2010-0114461.

(Continued)

*Primary Examiner* — Thomas G Black
*Assistant Examiner* — Ce Li
(74) *Attorney, Agent, or Firm* — Harness, Dickey & Pierce, P.L.C.

(57) ABSTRACT

A robot control method and apparatus estimates an error based on information of an object obtained using a motor drive current sensor, a force sensor or a tactile sensor mounted at a robot hand and information of the object obtained using an optical sensor and compensates for the error. The robot control method and apparatus includes measuring information of an object using an optical sensor or calculating information of the object input by a user, moving a robot hand to the object based on the information of the object, controlling the thumb and fingers of the robot hand to contact the object based on the information of the object, determining whether the thumb and fingers have contacted the object through a motor drive current sensor, a force sensor or a tactile sensor, and grasping the object depending upon whether the thumb and the fingers have contacted the object.

18 Claims, 6 Drawing Sheets

(56) References Cited

U.S. PATENT DOCUMENTS

| | | | |
|---|---|---|---|
| 8,260,458 B2* | 9/2012 | Kim et al. | 700/245 |
| 8,260,463 B2* | 9/2012 | Nakamoto et al. | 700/259 |
| 8,442,678 B2* | 5/2013 | Ichikawa et al. | 700/245 |
| 2008/0133058 A1* | 6/2008 | Ohno | 700/259 |
| 2008/0240889 A1* | 10/2008 | Yokoyama | 414/1 |
| 2009/0173560 A1* | 7/2009 | Nakamoto et al. | 180/167 |
| 2009/0285664 A1* | 11/2009 | Kim et al. | 414/730 |
| 2010/0138039 A1* | 6/2010 | Moon et al. | 700/245 |
| 2010/0139437 A1* | 6/2010 | Ichikawa et al. | 74/490.05 |

FOREIGN PATENT DOCUMENTS

| | | |
|---|---|---|
| JP | 2010-201538 | 9/2010 |
| KR | 10-0824780 | 4/2008 |
| KR | 10-2009-0118153 | 11/2009 |

OTHER PUBLICATIONS

Extended European Search Report dated Mar. 20, 2012 issued in corresponding European Patent Application No. 11185766.0.

Decision to Grant issued in European Patent Application No. 11185766.0, dated Jan. 19, 2015.

* cited by examiner

CONTROL OF ROBOT HAND TO CONTACT AN OBJECT

CROSS-REFERENCE TO RELATED APPLICATIONS

This application claims the benefit of Korean Patent Application No. 2010-0114461, filed on Nov. 17, 2010 in the Korean Intellectual Property Office, the disclosure of which is incorporated herein by reference.

BACKGROUND

1. Field

Embodiments relate to a robot control method that measures a position information error of an object and grasps the object based on the error.

2. Description of the Related Art

An industrial robot or an intelligent service robot grasps an object using a manipulator and an end-effector. When an object is to be grasped, the position of the object as recognized by a robot may be different from the actual position thereof due to an optical information error or abrupt movement of the object, resulting in failure of stable grasping.

In the related art, a force/torque sensor (hereinafter, referred to as an F/T sensor) is mounted at an end of a platform, i.e. a manipulator, and a sensor to sense force or touch is mounted at the thumb and at least one finger of a robot hand to achieve stable grasping. A position error is sensed and coped with using such sensor information.

In the related art, operations are repeatedly performed until conditions are satisfied. During the operations, the palm, the thumb and the fingers are repeatedly moved, and grasping time increases. That is, a process of compensating for position and direction errors may be time consuming.

SUMMARY

It is an aspect of an embodiment to provide a robot control method that estimates an error based on information of an object obtained using a motor drive current sensor, a force sensor or a tactile sensor mounted at a robot hand and information of the object obtained using an optical sensor of a robot and compensates for the error, thereby grasping the object on the first attempt.

Additional aspects of embodiments will be set forth in part in the description which follows and, in part, will be obvious from the description, or may be learned by practice of the invention.

In accordance with an aspect of an embodiment, a robot control method includes measuring information of an object to be grasped using an optical sensor of a robot or calculating information of the object input by a user, moving a robot hand to the object based on the information of the object, controlling the thumb and fingers of the robot hand to contact the object based on the information of the object, determining whether all of the thumb and the fingers have contacted the object through a motor drive current sensor, a force sensor or a tactile sensor provided at the thumb and the fingers, and grasping the object depending upon determination as to whether all of the thumb and the fingers have contacted the object.

The thumb and the fingers may each have at least one internode, and the motor drive current sensor, the force sensor or the tactile sensor may be provided at an end internode of the thumb and each of the fingers.

Grasping the object depending upon determination as to whether all of the thumb and the fingers have contacted the object may include adjusting angles of the end internodes of the thumb and the fingers to grasp the object depending upon determination as to whether the end internodes of the thumb and the fingers have contacted the object.

Grasping the object depending upon determination as to whether the thumb and the fingers have contacted the object may include applying pressure of the thumb and the fingers to the object to grasp the object when all of the thumb and the fingers have contacted the object.

Grasping the object depending upon determination as to whether the thumb and the fingers have contacted the object may include grasping the object depending upon determination as to whether an optimum grasping signal has been input by the user when all of the thumb and the fingers have not contacted the object.

Grasping the object depending upon determination as to whether the optimum grasping signal has been input by the user may include, upon determining that the optimum grasping signal has been input by the user, obtaining an optimum grasping shape based on the information of the object measured by the optical sensor or input by the user and the information of the object measured by the motor drive current sensor, the force sensor or the tactile sensor and grasping the object according to the obtained optimum grasping shape.

Grasping the object depending upon determination as to whether the optimum grasping signal has been input by the user may include, upon determining that the optimum grasping signal has not been input by the user, estimating a shape error based on the information of the object measured by the optical sensor or input by the user and the information of the object measured by the motor drive current sensor, the force sensor or the tactile sensor and determining whether the shape error has been compensated for to grasp the object.

Determining whether the estimated shape error has been compensated for to grasp the object may include, when the estimated shape error is less than a predetermined value, applying pressure of the thumb and the fingers to the object to grasp the object without compensating for the estimated shape error.

Determining whether the estimated shape error has been compensated for to grasp the object may include, when the estimated shape error is greater than the predetermined value, obtaining an optimum grasping shape based on the information of the object measured by the optical sensor or input by the user and the information of the object measured by the motor drive current sensor, the force sensor or the tactile sensor and grasping the object according to the obtained optimum grasping shape.

Grasping the object according to the optimum grasping shape may include moving the robot hand according to the optimum grasping shape, waiting for the fingers or the thumb not contacting the object to contact the object while contact between the thumb or the fingers and the object is maintained, and applying pressure of the thumb and the fingers to the object to grasp the object when all of the thumb and the fingers have contacted the object.

The information of the object to be grasped may include a position, size or shape of the object.

In accordance with another aspect of the present invention, a method of controlling a robot having a robot hand including a palm, a thumb and fingers, the thumb and the fingers each having at least one internode, includes measuring the position, size or shape of an object to be grasped using an optical sensor of the robot or calculating the position, size or shape of the object input by a user, moving the robot hand to the object based on the position of the object, encircling the object while the size of a circle formed by the palm and the internodes is reduced so as to correspond to the size of the object, determining whether all of the palm and the internodes have contacted the object through a motor drive current sensor, a force sensor or a tactile sensor provided at the palm and the internodes, and grasping the object depending upon determination as to whether all of the palm and the internodes have contacted the object.

Grasping the object depending upon determination as to whether the palm and the internodes have contacted the object may include applying pressure of the thumb and the fingers to the object to grasp the object when all of palm and the internodes have contacted the object.

Grasping the object depending upon determination as to whether the palm and the internodes have contacted the object may include grasping the object depending upon determination as to whether an optimum grasping signal has been input by the user when all of the palm and the internodes have not contacted the object.

Grasping the object depending upon determination as to whether the palm and the internodes have contacted the object may include, upon determining that the optimum grasping signal has been input by the user, obtaining an optimum grasping shape based on the position, size or shape of the object measured by the optical sensor or input by the user and the position, size or shape of the object measured by the motor drive current sensor, the force sensor or the tactile sensor and grasping the object according to the obtained optimum grasping shape.

Grasping the object depending upon determination as to whether the palm and the internodes have contacted the object may include, upon determining that the optimum grasping signal has not been input by the user, estimating a shape error based on the position, size or shape of the object measured by the optical sensor or input by the user and the position, size or shape of the object measured by the motor drive current sensor, the force sensor or the tactile sensor and determining whether the shape error has been compensated for to grasp the object.

Determining whether the estimated shape error has been compensated for to grasp the object may include, when the estimated shape error is less than a predetermined value, applying pressure of the thumb and the fingers to the object to grasp the object without compensating for the estimated shape error.

Determining whether the estimated shape error has been compensated for to grasp the object may include, when the estimated shape error is greater than the predetermined value, obtaining an optimum grasping shape based on the position, size or shape of the object measured by the optical sensor or input by the user and the position, size or shape of the object measured by the motor drive current sensor, the force sensor or the tactile sensor and grasping the object according to the obtained optimum grasping shape.

Grasping the object according to the optimum grasping shape may include moving the robot hand according to the optimum grasping shape, waiting for internodes not contacting the object to contact the object while contact between the internodes and the object is maintained, and applying pressure of the thumb and the fingers to the object to grasp the object when all of the internodes have contacted the object.

Estimating the shape error may include estimating the shape error based on the size of a circle formed by the palm contacting the object and some of the internodes contacting the object and the size of the object measured by the optical sensor or input by the user.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
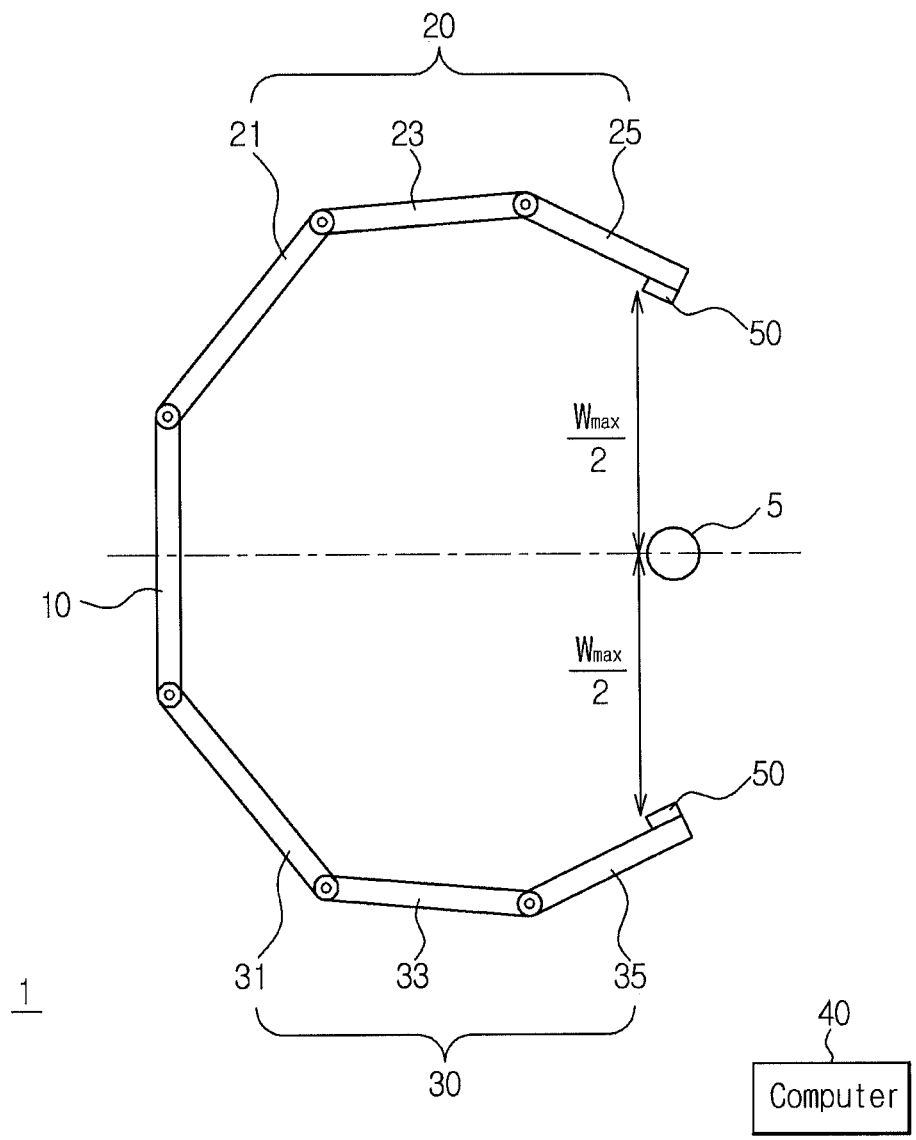
FIG. 1 is a schematic view illustrating a preshape of a robot hand according to an embodiment before grasping an object.

Reference will now be made in detail to embodiments, examples of which are illustrated in the accompanying drawings, wherein like reference numerals refer to like elements throughout.

FIG. 1 is a schematic view illustrating a preshape of a robot hand according to an embodiment before grasping an object using tips of the thumb and fingers of the robot hand.

A robot control method according to an embodiment is to grasp an object using tips of the thumb and fingers of a robot hand 1. The robot hand 1 grasps an object 5 in a state in which each finger and the thumb are opposite to each other, which is called pinching.

During pinching, the robot hand is moved first into a preshape. An angle of an MPP internode 21 is adjusted, while an angle of a PIP internode 23 and an angle of a DIP internode 25 are uniformly maintained, so that the robot hand assumes a preshape.

The preshape is assumed so that the distance between the thumb and each finger is greater than the maximum size W_max of an object that may be grasped through pinching and so that each finger and the thumb are approximately symmetrically disposed.

Next, the robot hand 1 slowly encircles the object 5 (encircling motion). A position at which each finger and the thumb contact each other is set to a 'target arrival point' of each finger 20 and the thumb 30. A Cartesian level trajectory is created from the preshape.

When contact at the each finger 20 or the thumb 30 is sensed through contact sensing, the robot hand is stopped.

Contact sensing determines whether each finger 20 and the thumb 30 have contacted the object using a motor drive current sensor (50), a force sensor (50) or a tactile sensor (50) or determines whether each finger 20 and the thumb 30 have contacted the object by estimating external force generated by contact between the each finger 20 and the thumb 30 and the object using feedback information of motor drive current.

In various embodiments, computer 40 can be used to control the robot hand 1. For example, the computer 40 can be used perform operations and/or calculations described herein to control and/or move a robot hand in as described herein. The computer 40 can be located on the robot hand 1, in a robot which includes the robot hand 1, or may be located somewhere other than the robot or the robot hand 1. For example, the computer 40 may be located remotely from the robot or the robot hand 1. Embodiments are not limited to the location of the computer 40.

Figure 2:
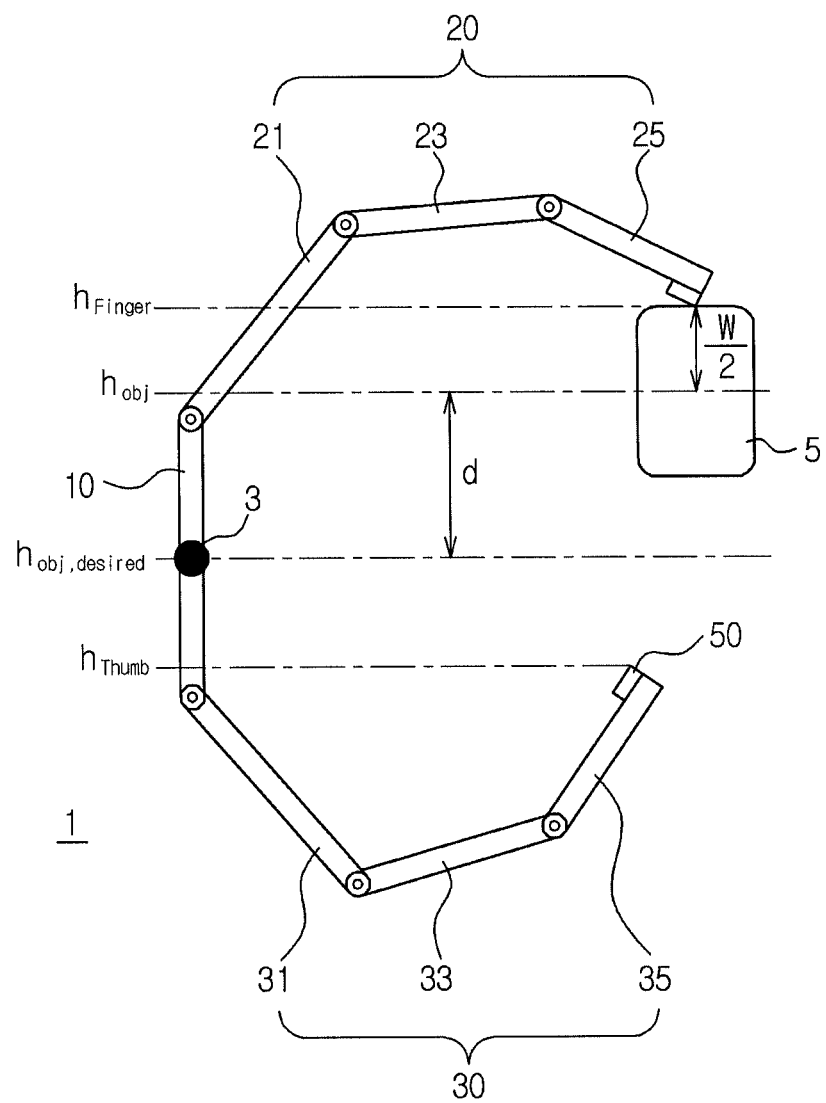
FIG. 2 is a schematic view illustrating the robot hand compensating for a shape error generated during a robot control process according to an embodiment.

FIG. 2 is a schematic view illustrating the robot hand compensating for a shape error generated during a robot control process according to an embodiment.

When only the thumb 30 contacts the object or only each finger 20 contacts the object, an error in a longitudinal direction of the palm is generated. At this time, the actual position of the object 5 may be confirmed based on the size of the object measured by an optical sensor of the robot.

A position $h_{Finger}$ contacting the object 5 and a position $h_{obj}$ of the object estimated based on the size of the object 5 are represented by the following mathematical expression.

$$h_{obj} = h_{Finger} - (w/2)$$

Where, w indicates the width of the object 5.

Also, a position error $error_{Hand}$ of the object 5 is represented by the following mathematical expression.

$$error_{Hand} = h_{obj} - h_{obj \cdot desired}$$

Where, $h_{obj \cdot desired}$ indicates an original center point position 3 of the object 5 recognized through the optical sensor of the robot.

Also, a distance d by which the robot hand 1 is to be moved so as to correspond to the position error $error_{Hand}$ of the object 5 is equal to the position error $error_{Hand}$ obtained above.

Figure 3:
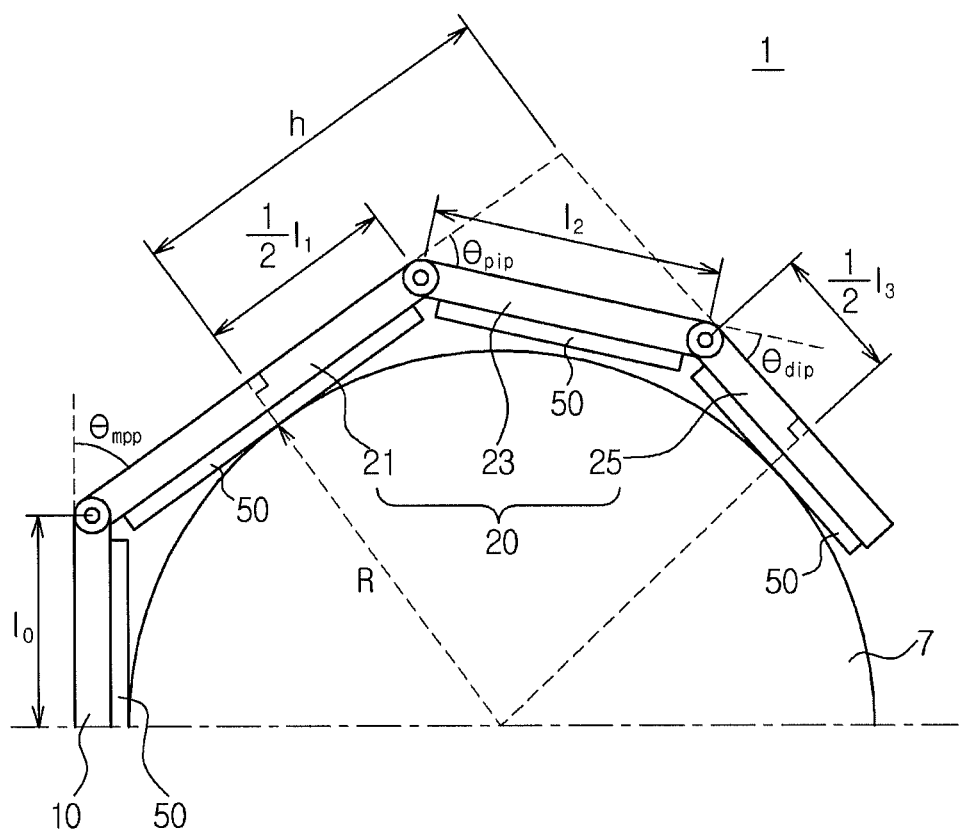
FIG. 3 is a schematic view illustrating a preshape of a robot hand according to another embodiment before grasping an object.

FIG. 3 is a schematic view illustrating a preshape of a robot hand according to another embodiment before grasping an object A robot control method according to another embodiment is to grasp an object 7 while encircling the object 7 using inside pads of fingers 20 and the thumb 30 and the surface of the palm, which is called power grasping.

During power grasping, the robot hand is moved first into a preshape. That is, the preshape is assumed so that the robot hand has the maximum radius R_max of an object 7 that may be grasped using internodes of each finger 20 and the thumb 30 based on the radius of the object 7 measured by an optical sensor of the robot.

Next, the robot hand 1 slowly encircles the object 7 (encircling motion). In this case, a relationship between the radius of the object 7 and the internodes of each finger 20 and the thumb 30 is set in consideration of the shape in which the object 7 is encircled by the palm and the inside surfaces of the respective internodes of each finger 20 and the thumb 30.

That is, a circle having a radius greater than the radius of the object 7 to be grasped contacts the palm and the inside surfaces of the respective internodes of each finger 20 and the thumb 30.

A radius trajectory of the robot hand 1 is created so as to reach the minimum radius R_min of the object 7 to be grasped using the power grasping from the preshape. That is, the object 7 is encircled while the radius of the circle formed by a contact point of the palm and the respective internodes of each finger 20 and the thumb 30 is gradually decreased.

In this case, the radius R of the circle formed by the robot hand and angles of the internodes of each finger 20 and the thumb 30 may be set through the following two mathematical expressions using the radius $R_{obj}$ of the object.

$$R = f(T_{current}, T_{duration}, R_{obj}, 5^*R_{obj})$$

$$f(R) = [\theta_{mpp}, \theta_{pip}]$$

In the first mathematical expression, $T_{current}$ indicates current time and $T_{duration}$ indicates time during which the radius of the circle formed by the contact point of the palm and the respective internodes of each finger 20 and the thumb 30 is gradually decreased. $5^*R_{obj}$ indicates a radius equivalent to five times the radius of the object 7, which may be changed based on the radius $R_{obj}$ of the object 7 to be grasped. That is, the radius R to be decreased has a trajectory approximate to the radius $R_{obj}$ of the object 7 from a radius greater than the radius $R_{obj}$ of the object 7 for time $T_{duration}$ during which the radius of the circle is decreased.

In the second mathematical expression, $\theta_{pip} = 3\theta$ and $\theta_{dip} = 2\theta$. An angle of each internode of the robot hand 1 is decided based on the radius R of the trajectory decided by the first mathematical expression.

In the same manner as in the pinching, when contact between the internodes of each finger 20 and the thumb 30 and the object is sensed through contact sensing, the robot hand is stopped.

Figure 4:
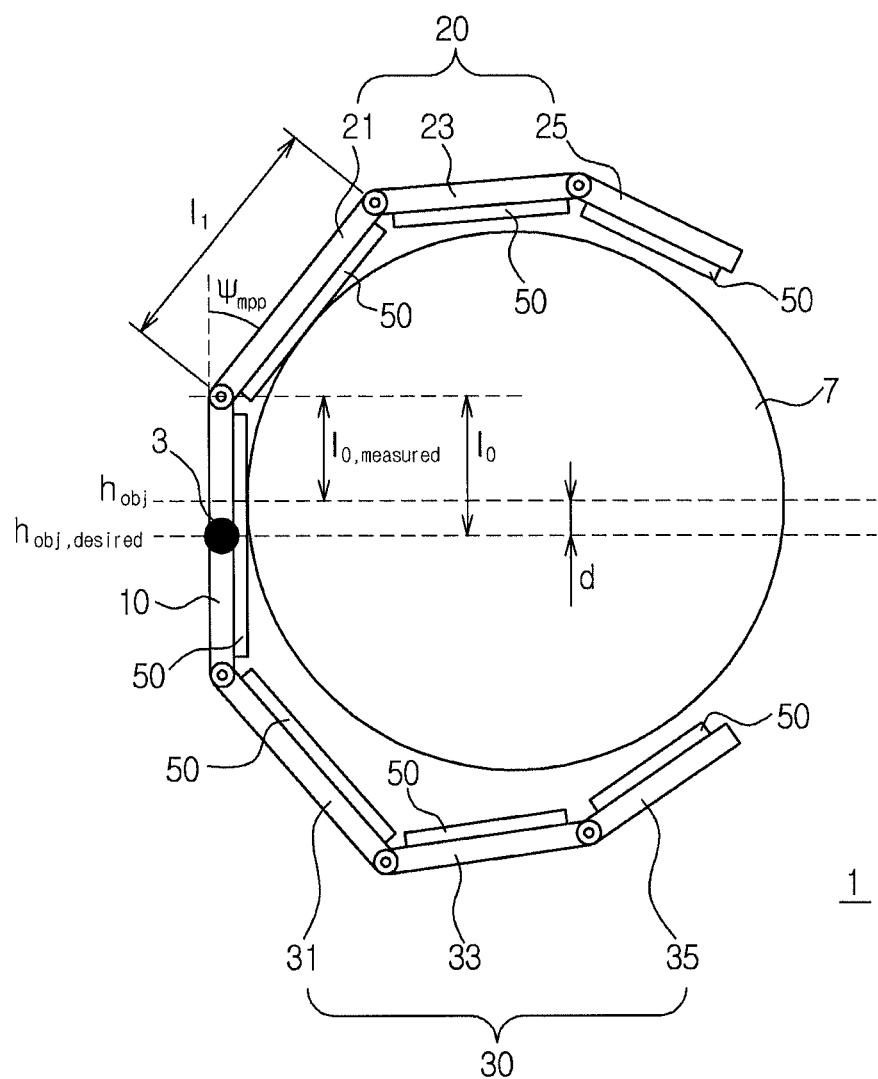
FIG. 4 is a schematic view illustrating the robot hand compensating for a shape error generated during a robot control process according to another embodiment.

FIG. 4 is a schematic view illustrating the robot hand compensating for a shape error generated during a robot control process according to another embodiment.

When only the thumb 30 contacts the object or only each finger 20 contacts the object, an error in a longitudinal direction of the palm is generated.

In a case in which a shape error is not generated, the radius R formed by the palm 10 and the internodes of each finger 20 and the thumb 30 is changed from R_max to T_min through the encircling motion. As a result, each finger 20 and the thumb 30 contact the object near the radius (R≈R_obj) of the object, and therefore, resistance torque is generated from each internode.

On the other hand, when only the thumb 30 or only each finger 20 contacts the object, an error in a longitudinal direction of the palm is generated. The encircling motion is ended in a state in which the radius R formed by the robot hand 1 is greater than the radius of the object (R>>$R_{obj}$), and therefore, resistance torque is generated at only the MPP internode 21 of each finger 20.

In this way, resistance is applied to the MPP internode 21 due to the position error or the shape error, and therefore, the radius R is changed, which is used inversely to confirm the actual position of the object 7 based on the size of the object 7 measured by the optical sensor of the robot and to estimate the shape error.

In the above, the following expression representing a relationship between the angle of the MPP internode 21, the radius R, the contact point position $I_0$, and the length of the first internode $I_1$ is used.

$$\pi - \theta_{mpp} = \tan^{-1}\left(\frac{R}{I_o}\right) + \tan^{-1}\left(\frac{R}{I_1/2}\right)$$

A portion which is changed according to the change of the actual position of the object 7 is the contact point position $I_0$ of the palm 10. Consequently, the actual radius of the object is substituted into R and the angle of the MPP internode 21 which is currently contacting the object is substituted to obtain $I_{0, measured}$.

Specifically, the following mathematical expressions are obtained from $I_{0, measured}$.

$$\pi - \Psi_{mpp} = \tan^{-1}(R/I_{0,measured}) + \tan^{-1}(R/(I_1/2))$$

$$(R/I_{0,measured}) =$$
$$\tan[\pi - \Psi_{mpp} - \tan^{-1}(R/(I_1/2))] = (R/(\tan[\pi - \Psi_{mpp} - \tan^{-1}(R/(I_1/2))]))$$

That is, $I_{0, measured}$ is obtained to know how much the actually measured position of the palm 10 of the robot hand deviates from the target position of the object 7. $I_{0,\,measured}$ is generated when the thumb and each finger do not contact the object 7. $I_{0,\,measured}$ may be obtained based on the angle $\psi_{mpp}$ formed when the object 7 contacts the finger internode 21 and the radius R.

The difference between the $I_0$ and $I_{0,\,measured}$ is estimated as a shape error amount error$_{Hand}$, by as much as which the palm 10 is moved to grasp the object 7.

That is, the shape error amount error$_{Hand}$ is represented by the following mathematical expression.

$$\text{error}_{Hand} = d = h_{obj} - h_{obj.desired} = I_0 - I_{0,measured}$$

When each finger 20 or the thumb 30 contacts the object 7 as previously described, it may be determined that there is an error between the position 3 of the object 7 measured by the optical sensor and the actual position of the object. The palm 10 is moved by the calculated distance d to compensate for the estimated position error and grasp the object.

At the same time, each finger 20 continues to perform the encircling motion. With the movement of the palm 10, the internode 21 is separated from the object 7. Consequently, the tip of the each finger is moved from the current position based on the trajectory created in the encircling motion and the movement of the palm 10.

As a result, the internode 21, contacting the object 7, is not separated from the object 7 even upon movement of the palm 10. The tip of the thumb 30, not contacting the object, is moved according to the trajectory created in the encircling motion. Consequently, contact between the thumb 30 and the object 7 is achieved when the movement of the palm 10 is ended.

In the position error compensation process, the movement of the palm 10 and the movement of each finger 20 and the thumb 30 are simultaneously performed, and therefore, grasping time is not greatly increased even when the position error is generated.

Figure 5:
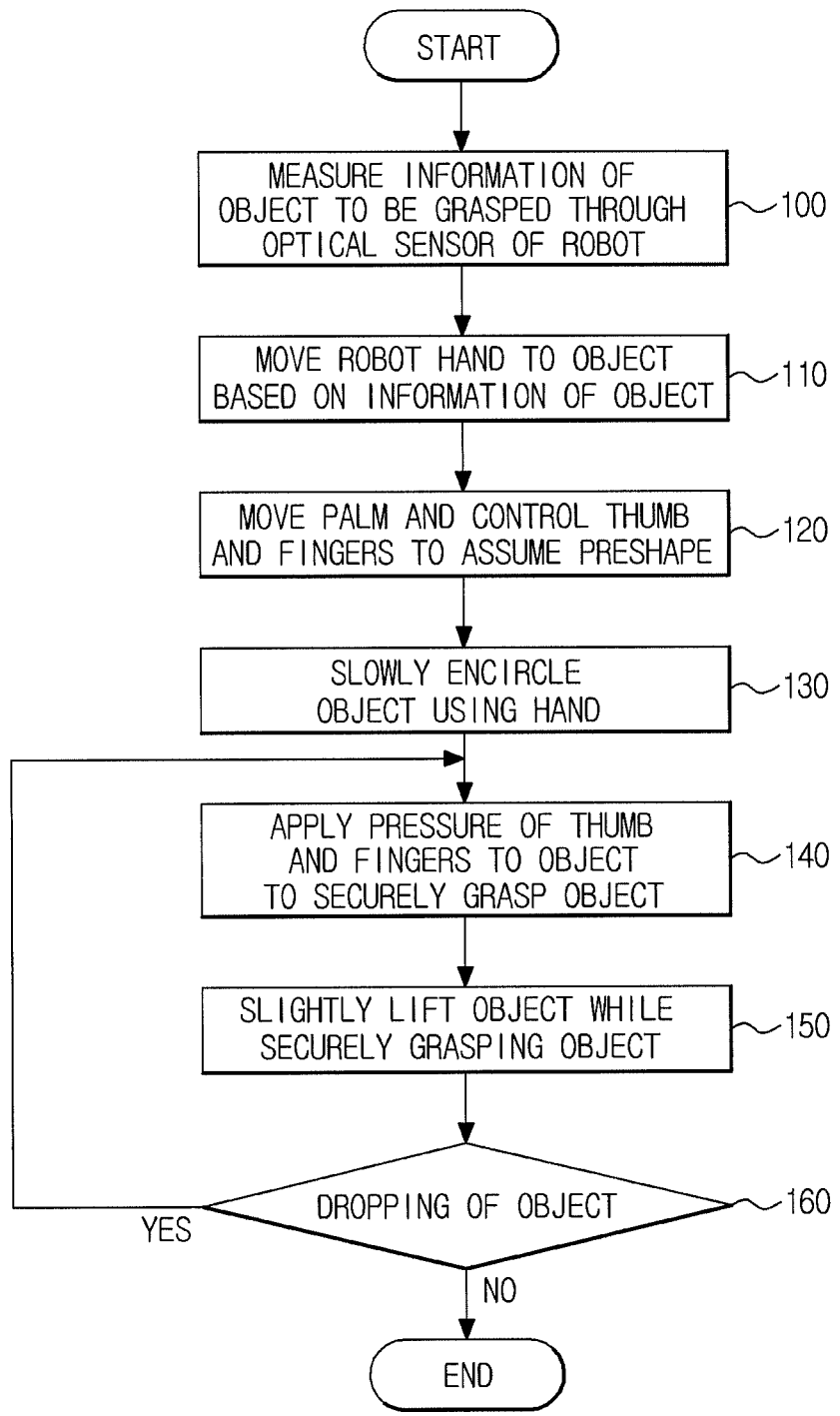
FIG. 5 is a flow chart illustrating a robot control process according to a further embodiment.

FIG. 5 is a flow chart illustrating a robot control process according to a further embodiment.

First, information regarding the object 5 to be grasped is measured by the optical sensor of the robot. Here, the information regarding the object 5 includes the position and size (shape) of the object 5. The measured position and size (shape) of the object 5 serve as a reference in grasping the object 5 using the robot hand 1 (100).

Subsequently, the robot hand 1 approaches the object 5 based on the measured information of the object 5 (in particular, the position of the object) (110). The palm 10 of the robot hand 1 is moved based on the information of the object 5, and each finger 20 and the thumb 30 assume a preshape. Here, the preshape is a preliminary operation performed before grasping the object 5, whereby the object 5 is stably grasped without damage thereto (120).

Subsequently, the robot hand 1 is operated to slowly encircle the object 5. There is a difference between the information of the object measured by the optical sensor of the rotor and the actual information of the object at the time of grasping due to an error of the information of the object measured by the optical sensor of the robot and abrupt movement of the object 5 (generation of a shape error). The movement of the robot hand 1 is controlled in consideration of such difference. That is, when grasping the object ignoring the shape error, the object may be brought down or damaged during grasping, or the object may be unstably grasped with the result that the object may be dropped, which is prevented by the encircling motion (130).

Subsequently, pressure from each finger 20 and the thumb 30 is applied to the object 5 to securely grasp the object (a securely grasping operation), which is a process of stably grasping the object 5 (140).

In a state in which the object 5 is securely grasped, the object 5 is slightly lifted (150). It is determined whether the securely grasped object 5 drops (160). When the object 5 does not drop, the grasping process is ended. When the object 5 drops, pressure from each finger 20 and the thumb 30 is reapplied to the object 5 to securely grasp the object (Operation 140).

Figure 6:
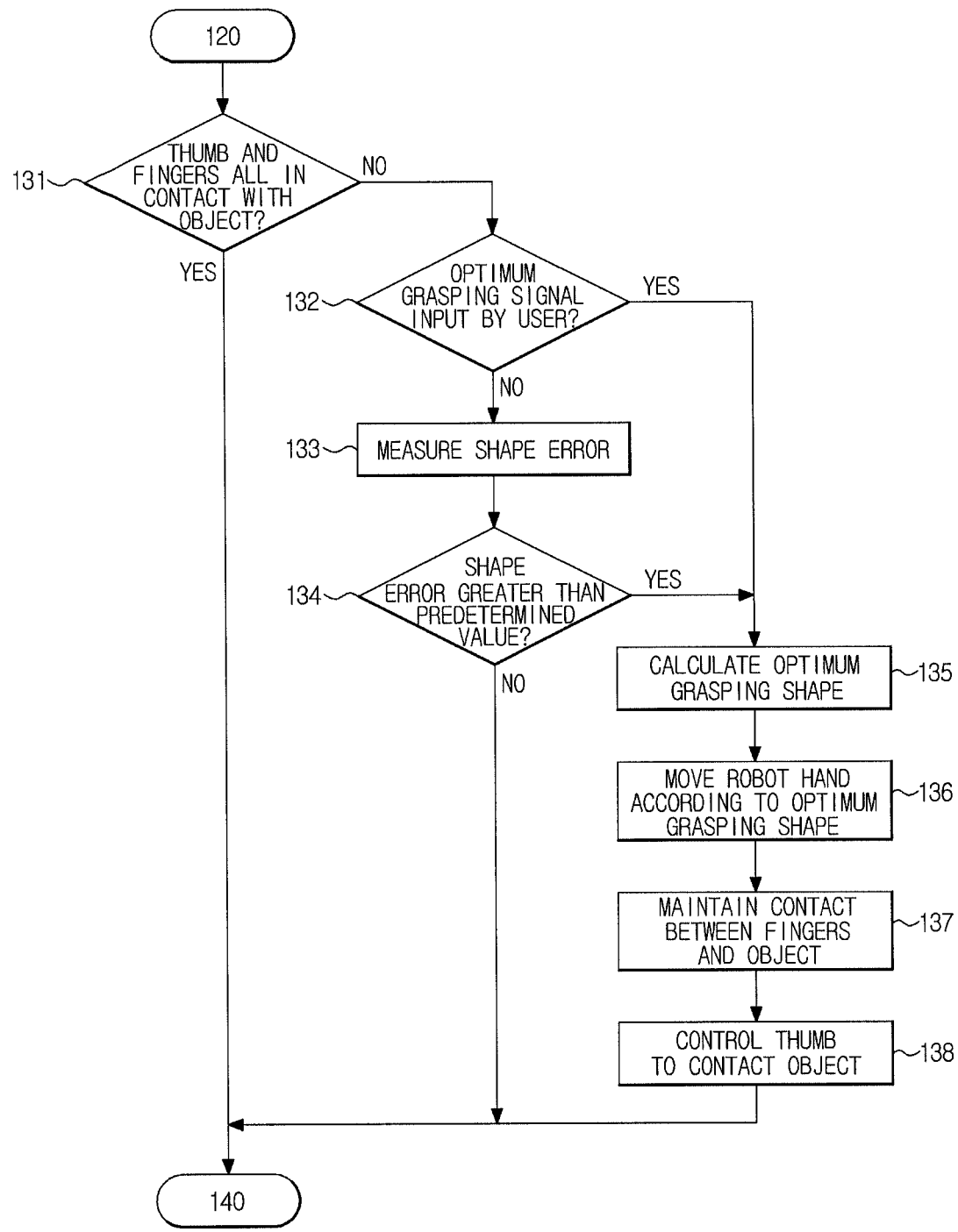
FIG. 6 is a schematic view illustrating a process in which a robot hand slowly encircles an object to be grasped during the robot control process according to an embodiment.

FIG. 6 is a schematic view illustrating a process in which the robot hand slowly encircles the object to be grasped during the robot control process according to an embodiment.

FIG. 6 illustrates details of Operation 130 at which the robot hand 1 slowly encircles the object 5.

First, it is determined whether all of each finger 20 and the thumb 30 of the robot hand 1 contact the object 5 (131). When all of each finger 20 and the thumb 30 of the robot hand 1 contact the object 5, pressure from each finger 20 and the thumb 30 is applied to the object 5 shown in FIG. 5 to securely grasp the object 5 (Operation 140).

When all of each finger 20 and the thumb 30 of the robot hand 1 do not contact the object 5, it is determined whether an optimum grasping signal has been input by a user, by which it is determined whether grasping is to be performed although there is a minute shape error (for example, grasping time is reduced although grasping is incorrect) or optimum grasping is to be performed after such a minute shape error is compensated (132).

When the optimum grasping signal has not been input by the user, a shape error is estimated based on the information of the object 5 measured by the optical sensor of the robot and the information of the object 5 measured by the motor drive current sensor (50), the force sensor (50) or the tactile sensor (50) provided at each finger 20 and the thumb 30 of the robot hand 1. The information of the object 5 measured by the optical sensor of the robot includes the position and size (shape) of the object 5, which is a target of the robot hand 1. The information of the object 5 measured by the motor drive current sensor (50), the force sensor (50) or the tactile sensor (50) provided at each finger 20 and the thumb 30 of the robot hand 1 includes the actual position and size (shape) of the object 5. That is, the actual position or size of the object 5 is changed due to an error of the optical sensor or other external environmental factors. Such a change is a shape error (133).

It is determined whether the estimated shape error is greater than a predetermined value. As long as the object 5 is grasped, the estimated shape error may be ignored. That is, it may be determined whether the shape error is ignored in consideration of grasping time or properties of the object 5 to be grasped (134).

When the estimated shape error is not greater than the predetermined value, Operation 140 of FIG. 5 is performed. On the other hand, when the estimated shape error is greater than the predetermined value, an optimum grasping shape is calculated based on the estimated shape error (135).

For example, when the shape error is not greater than 2 cm, it is determined that there is no obstacle in grasping the object 5, and the grasping process is performed ignoring the shape error. When the shape error is greater than 2 cm, it is determined that there is an obstacle in grasping the object 5, and the shape error is compensated to grasp the object.

The robot hand 1 is moved according to the calculated optimum grasping shape. The position and size of the object 5 measured by the optical sensor of the robot are different from the actual position and size of the object measured by the contact sensor (50). Consequently, the robot hand 1 is moved based on the actual position and size of the object 5 (136).

Although the robot hand 1 is moved, contact between each finger 20 and the object 5 is maintained. Specifically, the movement of the robot hand 1 is the movement of the palm 10 of the robot hand 1. With the movement of the palm 10, each finger 20 and the thumb 30 are also moved. In this case, each finger 20 contacts the object at a correct position, which is maintained. The thumb 30, not contacting the object 5, is moved according to the optimum grasping shape previously calculated for optimum grasping (137).

The thumb 30, not contacting the object 5, comes into contact with the object 5. Upon movement of the palm of the robot hand 1, the thumb 30, not contacting the object 5, is also moved. When the thumb 30 moves and comes into contact with the object 5, movement of the robot hand 1 is stopped (138).

Consequently, all of each finger 20 and the thumb 30 contacts the object 5, and Operation 140 of FIG. 5 is performed.

Operations 136, 137 and 138 are performed simultaneously. That is, the optimum grasping shape is calculated based on the shape error, the palm 10 of the robot hand 1 is moved according to the calculated optimum grasping shape, and, at the same time, the thumb 30, not contacting the object 5, comes into contact with the object 5.

As is apparent from the above description, the disclosed robot control method compensates a shape error of an object generated due to an error of the optical sensor of the robot or unexpected movement of the object using the measured by the motor drive current sensor, the force sensor or the tactile sensor provided at the robot hand, thereby improving grasping performance.

Embodiments can be implemented in computing hardware and/or software, such as (in a non-limiting example) any computer that can store, retrieve, process and/or output data and/or communicate with other computers. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method comprising:
    moving a robot hand to an object to be grasped, based on information of the object;
    after the robot hand is moved to the object, controlling a thumb and fingers of the robot hand to contact the object based on the information of the object;
    determining whether all of the thumb and the fingers have contacted the object through at least one of a motor drive current sensor, a force sensor and a tactile sensor; and
    grasping the object depending upon a result of said determining, the grasping including,
        applying pressure of the thumb and the fingers to the object to grasp the object, when said determining determines that all of the thumb and the fingers have contacted the object, and
        grasping the object based on an optimum grasping signal input by a user, when said determining determines that all of the thumb and the fingers have not contacted the object.

2. The method according to claim 1, wherein
    the thumb and the fingers each have at least one internode, and
    said at least one of the motor drive current sensor, the force sensor and the tactile sensor includes at least one of a motor drive current sensor, a force sensor and a tactile sensor provided at an end internode of the thumb and each of the fingers.

3. The method according to claim 2, wherein said grasping comprises adjusting angles of the end internodes of the thumb and the fingers to grasp the object based on said determining.

4. The method according to claim 1, wherein the information of the object comprises a position and size of the object.

5. The method according to claim 1, wherein said grasping the object based on the optimum grasping signal input by the user comprises, upon determining that the optimum grasping signal has been input by the user, obtaining an optimum grasping shape based on the information of the object used by said moving to move the robot hand and information of the object measured by said at least one of the motor drive current sensor, the force sensor an the tactile sensor, and grasping the object according to the obtained optimum grasping shape.

6. The method according to claim 5, wherein said grasping the object according to the optimum grasping shape comprises:
    moving the robot hand according to the optimum grasping shape,
    waiting for any of the fingers and the thumb not contacting the object to contact the object while contact between others of the thumb and the fingers and the object is maintained, and
    applying pressure of the thumb and the fingers to the object to grasp the object when all of the thumb and the fingers have contacted the object.

7. The method according to claim 1, wherein said grasping the object based on the optimum grasping signal input by the user comprises, upon determining that the optimum grasping signal has not been input by the user, estimating a shape error based on information of the object used by said moving to move the robot hand and information of the object measured by said at least one of the motor drive current sensor, the force sensor and the tactile sensor, and determining whether the estimated shape error has been compensated for to grasp the object.

8. The method according to claim 7, wherein said determining whether the estimated shape error has been compensated for to grasp the object comprises, when the estimated shape error is less than a predetermined value, applying pressure of the thumb and the fingers to the object to grasp the object without compensating for the estimated shape error.

9. The method according to claim 7, wherein said determining whether the estimated shape error has been compensated for to grasp the object comprises, when the estimated shape error is greater than a predetermined value,
    obtaining an optimum grasping shape based on the information of the object used by said moving to move the robot hand and the information of the object measured by said at least one of the motor drive current sensor, the force sensor and the tactile sensor, and grasping the object according to the obtained optimum grasping shape.

10. A method of controlling a robot hand comprising a palm, a thumb and fingers, the thumb and the fingers each having at least one internode, the method comprising: obtaining a position and size of an object to be grasped by measuring the position and size of the object using an optical sensor or calculating the position and size of the object input by a user; moving the robot hand to the object based on the obtained position of the object; encircling the object with the robot hand while a size of a circle formed by the palm and the internodes is reduced so as to correspond to the obtained size of the object; determining whether all of the palm and the internodes have contacted the object through at least one of a motor drive current sensor, a force sensor and a tactile sensor provided at the palm and the internodes; and grasping the object depending upon a result of said determining, the grasping including, applying pressure of the thumb and the fingers to the object to grasp the object, when said determining determines that all of the thumb and the fingers have contacted the object, and grasping the object based on a determination as an optimum grasping signal input by the user, when said determining determines that all of the palm and the internodes have not contacted the object.

11. The method according to claim 10, wherein said grasping the object depending upon said determination comprises, upon determining that the optimum grasping signal has been input by the user, obtaining an optimum grasping shape based on the position and size obtained by said obtaining and information of the object measured by said at least one of the motor drive current sensor, the force sensor and the tactile sensor, and grasping the object according to the obtained optimum grasping shape.

12. The method according to claim 11, wherein grasping the object according to the obtained optimum grasping shape comprises:

moving the robot hand according to the optimum grasping shape, waiting for internodes not contacting the object to contact the object while contact between others of the internodes and the object is maintained, and applying pressure of the thumb and the fingers to the object to grasp the object when all of the internodes have contacted are brought into contact with the object.

13. The method according to claim 10, wherein said grasping the object depending upon said determination comprises, upon determining that the optimum grasping signal has not been input by the user, estimating a shape error based on the position and size of the object obtained by said obtaining and information of the object measured by said at least one of the motor drive current sensor, the force sensor and the tactile sensor, and determining whether the estimated shape error has been compensated for to grasp the object.

14. The method according to claim 13, wherein determining whether the estimated shape error has been compensated for to grasp the object comprises, when the estimated shape error is less than a predetermined value, applying pressure of the thumb and the fingers to the object to grasp the object without compensating for the estimated shape error.

15. The method according to claim 13, wherein determining whether the estimated shape error has been compensated for to grasp the object comprises, when the estimated shape error is greater than a predetermined value, obtaining an optimum grasping shape based on the position and size of the object obtained by said obtaining and information of the object measured by said at least one of the motor drive current sensor, the force sensor and the tactile sensor, and grasping the object according to the obtained optimum grasping shape.

16. The method according to claim 13, wherein said estimating the shape error comprises estimating the shape error based on a size of a circle formed by the palm contacting the object and some of the internodes contacting the object and a size of the object obtained by said obtaining.

17. A method comprising:

determining, using a computer and using sensors located on a robot hand that has a thumb and fingers, whether all of the thumb and the fingers are in contact with an object to be grasped by the robot hand;

controlling, using the computer, the robot hand by, applying pressure of the thumb and the fingers to the object so that the robot hand grasps the object, when said determining determines that all of the thumb and the fingers have contacted the object, and grasping the object with the robot hand based on an optimum grasping signal input by a user, when said determining determines that all of the thumb and the fingers have not contacted the object.

18. An apparatus comprising:

a robot hand including a thumb and fingers, and sensors located on the robot hand; and a computer configured to, determine, from information obtained by the sensors, whether all of the thumb and the fingers are in contact with an object to be grasped by the robot hand, and control the robot hand by, applying pressure of the thumb and the fingers to the object so that the robot hand grasps the object, when the computer determines that all of the thumb and the fingers have contacted the object, and grasping the object with the robot hand based on an optimum grasping signal input by a user, when the computer determines that all of the thumb and the fingers are not in contact with the object.

\* \* \* \* \*